United States Patent [19]

Tsunemitsu et al.

[11] 3,925,457
[45] Dec. 9, 1975

[54] SUBSTITUTED O-[4-(N-ALKYL-N-PHENYLAMINO)-2-HYDROXYBENZOYL]-BENZOIC ACID

[75] Inventors: Katsuhiko Tsunemitsu; Kanji Kiuchi; Yasushi Nakai; Hajime Kawai; Shimpei Yamada, all of Kyoto, Japan

[73] Assignee: Yamada Kagaku Kenkyusho Co., Ltd., Japan

[22] Filed: Sept. 9, 1974

[21] Appl. No.: 504,078

Related U.S. Application Data

[62] Division of Ser. No. 319,026, Dec. 27, 1972.

[30] Foreign Application Priority Data

Dec. 27, 1971 Japan.................... 46-311

[52] U.S. Cl. .............. 260/517; 260/335; 427/151; 428/29
[51] Int. Cl.² ........................................ C07C 101/78
[58] Field of Search ................................ 260/517

[56] References Cited
UNITED STATES PATENTS 3,873,573   3/1975   Farber et al. .................... 260/343.4

*Primary Examiner*—James A. Patten

[57] ABSTRACT

Novel 6-(N-alkyl-N-arylamino)fluorans represented by the formula:

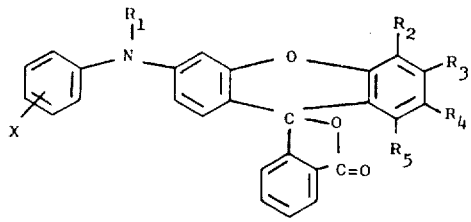

wherein X means a hydrogen atom, a halogen atom or an alkyl radical having from one to five carbon atoms, $R_1$ means an alkyl radical having from one to five carbon atoms, $R_2$, $R_3$ and $R_5$ mean a hydrogen atom, a halogen atom or an alkyl radical having from one to five carbon atoms, $R_4$ means a hydrogen atom, a halogen atom, an alkyl radical having from one to five carbon atoms, an amino, an alkylamino, an aralkylamino or an arylamino radical, or either $R_2$ together with $R_3$ or $R_4$ together with $R_5$ may represent an aromatic ring residue.

They are useful as a coloring agent for use in manufacturing pressure sensitive copying paper.

4 Claims, No Drawings

SUBSTITUTED O-[4-(N-ALKYL-N-PHENYLAMINO)-2-HYDROXYBENZOYL]-BENZOIC ACID

This is a division of application Ser. No. 319,026, filed Dec. 27, 1972.

This invention relates to novel 6-(N-alkyl-N-arylamino)fluoran derivatives having chromogenic properties. More particularly, it relates to novel chromogenic compounds having the structural formula (III)

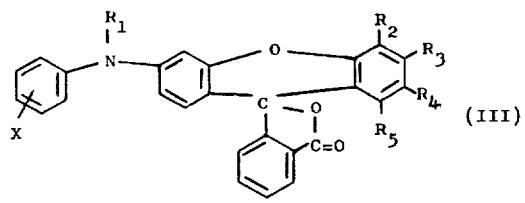

wherein X means a hydrogen atom, a halogen atom or an alkyl radical having from one to five carbon atoms, $R_1$ means an alkyl radical having from one to five carbon atoms, $R_2$, $R_3$ and $R_5$ mean a hydrogen atom, a halogen atom or an alkyl radical having from one to five carbon atoms, and $R_4$ means a hydrogen atom, a halogen atom, an alkyl radical having from one to five carbon atoms, an amino, an alkylamino, an aralkylamino or an arylamino radical, or either $R_2$ together with $R_3$ or $R_4$ together with $R_5$ may represent a aromatic ring residue.

The present invention also relates to a pressure sensitive copying composition comprising admixture of the above defined compound with wax or pressure rupturable microcapsules encapsulated a solution of said chromogenic compound with a film-forming polymeric material.

Further the present invention relates to a method for preparing said novel chromogenic compounds having the structural formula (III) as defined above comprising by reacting an aromatic ketone having the structural formula (I);

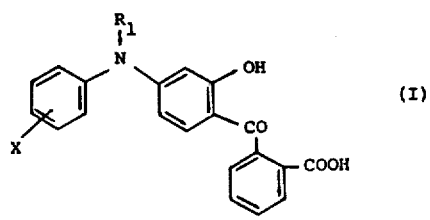

wherein $R_1$ and X have the same meaning as in the formula (III), with a phenol derivative having the formula (II);

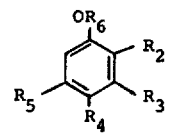

wherein $R_2$, $R_3$, $R_4$ and $R_5$ have the same meaning as in the formula (III) and $R_6$ means a hydrogen atom or a lower alkyl radical.

The chromogenic compounds of the formula (III) of the present invention are almost colorless. They may be changed rapidly into their colored form by bringing them into contact with an electron acceptor or an acidic substance such as bentonite, phenol etc., therefore, they are particularly suitable as a coloring agent for pressure sensitive copying sheets.

It has been known that the compounds of the fluoran series having a dialkylamino of N-alkyl-N-aralkylamino group as the substituent at 6-position may be used as a coloring agent for the same type of copying sheets.

It has been also known that the known fluoran derivatives having a dialkylamino group at their 6-position tend to color spontaneously under atmospheric condition without bringing them into contact with an electron acceptor.

Their solubilities in organic solvents are not sufficient as the coloring agent for pressure sensitive copying sheets.

These disadvantages have now overcome by the compounds of the present invention. A coloring agent which colors black may be obtained by mixing two or more compounds of the present invention which may color in two or more tones i.e. green and red.

The mixture has a excellent, uniform coloring speed, light-fastness and solubility in organic solvents.

According to the present invention, the aforementioned compounds (III) may be prepared by reacting the starting ketones (I) with the phenol derivatives (II), preferably on a equimolar basis at room or an elevated temperature in the presence of sulfuric acid.

The starting ketones (I) are also novel compounds and they may be prepared by reacting a m-hydroxy-N-alkyldiphenylamine with phthalic anhydride in toluene under heating as shown by the following reaction scheme:

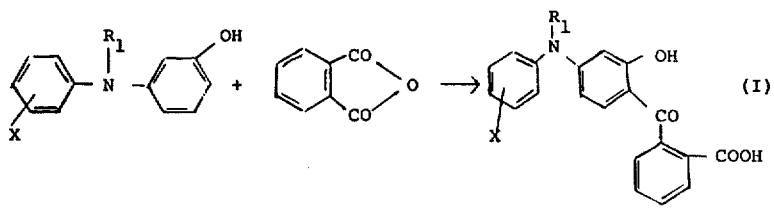

in which X and $R_1$ have the same meaning as in the form 1a (III).

Examples of these compounds (I) are given in the following Table I.

Table I

| X | $R_1$ | m.p. (°C) |
|---|---|---|
| p—CH$_3$ | CH$_3$ | 201 – 202 |
| p—CH$_3$ | C$_2$H$_5$ | 201 – 202 |
| H | CH$_3$ | 164 – 165 |
| H | C$_2$H$_5$ | 188 – 189 |

Examples of the phenolic compound represented by the structural formula (II) include alkylphenol such as p-cresol, or p-t-butylphenol; halogenated alkylphenol such as 4-chloro-3-methylphenol; alkylalkoxybenzene such as p-methylanisole; halogenated alkyl-alkoxybenzene such as 4-chloro-3-methylanisole; aminophenols such as p-aminophenol, p-methylaminophenol, p-benzylamino-phenol, p-(N-methyl-N-phenylamino)- phenol, p-(N-methyl-N-tolylamino)phenol or p-(N-ethyl-N-phenylamino)phenol; aminoalkoxybenzene such as p-(N-methyl-N-phenylamino)anisole, p-(N-methyl-N-tolylamino) anisole or p-(N-ethyl-N-phenylamino)anisole; α-naphthol and β-naphthol.

In the following Table II, examples of the compounds (III) are given together with their melting points and color tones when developed with bentonite.

In the foregoing Table, "color tone" means the color of bentonite that has been developed by adding bentonite to a solution of the test compound in monochlorobenzene.

In the following Table III, a comparison was made as to the solubilities in monoisopropyl-biphenyl at 25°C between some of the compounds (III) of the present invention and several known compounds of similar type.

Table II

| No. | $R_1$ | $R_2$ | $R_3$ | $R_4$ | $R_5$ | X | m.p.(°C) | resultant color tone |
|---|---|---|---|---|---|---|---|---|
| 1 | —$C_2H_5$ | H | H | —$CH_3$ | H | p—$CH_3$ | 150–153 | red |
| 2 | —$C_2H_5$ | H | H | —C($CH_3$)$_3$ | H | p—$CH_3$ | 241–242 | red |
| 3 | —$C_2H_5$ | H | —$CH_3$ | —Cl | H | p—$CH_3$ | 170–173 | red |
| 4 | —$C_2H_5$ | H | H | —CH=CH–CH=CH | | p—$CH_3$ | 217–218 | red |
| 5 | —$C_2H_5$ | —CH=CH–CH=CH | H | | H | p—$CH_3$ | 204–207 | red |
| 6 | —$C_2H_5$ | H | —$CH_3$ | —N(CH$_3$)(C$_6$H$_5$) | H | p—$CH_3$ | 208–210 | dark red |
| 7 | —$C_2H_5$ | H | H | —$NH_2$ | H | p—$CH_3$ | 185–187 | brown |
| 8 | —$C_2H_5$ | H | H | —$NHCH_3$ | H | p—$CH_3$ | 207–209 | dark green |
| 9 | —$C_2H_5$ | H | H | —N(CH$_2$C$_6$H$_5$)$_2$ | H | p—$CH_3$ | 156–158 | dark green |
| 10 | —$CH_3$ | H | H | —N(CH$_3$)(C$_6$H$_5$) | H | p—$CH_3$ | 148–150 | dark green |
| 11 | —$C_2H_5$ | H | H | —N(CH$_3$)(C$_6$H$_5$) | H | H | 160–161 | dark green |
| 12 | —$C_2H_5$ | H | H | —N(CH$_3$)(C$_6$H$_4$–CH$_3$) | H | p—$CH_3$ | 162–163 | dark green |
| 13 | —$C_2H_5$ | H | H | —N(CH$_3$)(C$_6$H$_5$) | H | p—$CH_3$ | 168–170 | dark green |

Table III

| | Compound | Solubility |
|---|---|---|
| The present invention | 2-methyl-6-(N-ethyl-N-p-tolylamino)fluoran | >30 % |
| | 1,3-dimethyl-6-(N-ethyl-N-p-tolylamino)fluoran | >15 % |
| | 2-(N-methyl-N-p-tolylamino)-6-(N-ethyl-N-p-tolylamino)-fluoran | >25 % |
| Known compound | 2-methyl-6-diethylamino-fluoran | <15 % |
| | 1,3-dimethyl-6-diethylamino-fluoran | <5 % |
| | 2-(N-methyl-N-p-tolylamino)-6-diethylaminofluoran | <15 % |

Table IV below shows the results of light exposure test of the compounds (III) of the present invention in comparison with some known compounds of similar type in which the test compounds were applied to clay-coated papers and changes of their color tones were observed at intervals of exposure time as indicated using Shimadzu Fade-tester (Type: CF-20-S, JIS 1044).

Table IV

| | Coloring agent | Exposure time (minutes) | | | |
|---|---|---|---|---|---|
| | | 0 | 30 | 60 | 120 |
| The present invention | 2-(N-methyl-N-phenylamino)-6-(N-methyl-N-p-tolylamino)fluoran | dark green | dark green | dark green | gray |
| | 2-(N-methyl-N-p-tolylamino)-6-(N-ethyl-N-p-tolylamino)-fluoran | dark green | dark green | dark green | gray |
| Known compound | 2-phenylamino-6-diethylaminofluoran | dark green | reddish brown | pale reddish brown | pale reddish brown |
| | 2-(N-methyl-N-phenylamino)-6-diethylaminofluoran | dark green | dark green | dark reddish green | reddish green |

From the foregoing tables, it can be seen that the chromogenic compounds of the present invention are superior to known compounds of similar type in their solubility and lightfastness.

In one of the embodiments of the present invention, the chromogenic compounds of the formula (III) are dissolved in wax such as carnauba wax, and the solution is applied to a support sheet. Alternatively the chromogenic compounds are dissolved in a mixture of a bipheny solvent such as chlorinated biphenyl and a petroleum solvent such as kerosene. The solution is then encapsulated into rupturable microcapsules. Any conventional techniques for microcapsulation may be used using appropriate film-forming polymeric materials such as gelatin, gum arabic, casein, or the mixture thereof. The capsules are applied to a support sheet. Sheets coated with the wax solution or microcapsules are then placed on another sheet having a coating layer of acid clay so that the coating layers are in contact with each other.

When pressure is applied such as by writing, the chromogenic compound included in the wax or microcapsules is brought into reactive contact with acid clay either by the impregnation from the wax or by the rupture of the capsules in areas where pressure has been applied so that a colored marking is developed on the sheets.

As the support sheet, sheets made of paper, fabric or plastic film may be used for the present invention.

The chromogenic compounds of the present invention are useful not only for manufacturing copying sheets of pressure-sensitive type but they may be used as the coloring agent for those of heat-sensitive type.

EXAMPLE 1

Preparation of 2-methyl-6-(N-ethyl-N-p-tolylamino) fluoran.

37.5g of o-[4-(N-ethyl-N-p-tolylamino)-2-hydroxybenezoyl]benzoic acid and 10.8g of p-cresol were dissolved in 200g of concentrated sulfuric acid below 25°C. The solution was allowed to react for 40 hours at 25°C with stirring. The reaction mixture was poured into a large amount of ice-water and then filtered. The resulting paste was made weakly-alkaline with sodium hydroxide, stirred and filtered. The filtered paste was washed with water, and recrystallized from toluene. 13g of white crystals melting at 150° – 153°C was obtained. The compound immediately turned red when contacted with bentonite.

EXAMPLE 2

Preparation of 2-chloro-3-methyl-6-(N-ethyl-N-p-tolylamino)fluoran.

37.5g of o-[4-(N-ethyl-N-p-tolylamino)-2-hydroxybenzoyl]benzoic acid and 14.2g of 4-chloro-3-methylphenol were dissolved in 200g of concentrated sulfuric acid below 25°C. The solution was allowed to react for 48 hours at 25°C. The reaction mixture was treated in the manner same as in Example 1. 26g of white crystals melting at 170° – 173°C was obtained. The compound immediately turned red when contacted with bentonite.

EXAMPLE 3

Preparation of 3, 4-benz-6-(N-ethyl-N-p-tolylamino) fluoran.

37.5g of o-[4-(N-ethyl-N-p-tolylamino)-2-hydroxybenzoyl) benzoic acid and 14.4g of α-naphthol were dissolved in 200g of concentrated sulfuric acid below 25°C. The solution was allowed to react for 60 hours at 25°C with stirring. The reaction mixture was treated in the same manner as in Example 1. 18g of white crystals melting at 204° – 207°C was obtained. The compound immediately turned red when contacted with bentonite.

EXAMPLE 4

Preparation of 2-(N-methyl-N-phenylamino)-6-(N-methyl-N-p-tolylamino)fluoran.

36.1g of o-[4-(N-methyl-N-p-tolylamino)-2-hydroxybenzoyl] benzoic acid and 19.9g of 4-hydroxy-N-methyldiphenylamine were dissolved in 200g of concentrated sulfuric acid below 25°C. The solution was allowed to react for 48 hours at 25°C with stirring. The reaction mixture was treated in the same manner as in Example 1. 25g of white crystals melting at 148° – 150°C was obtained. The compound immediately turned green when contacted with bentonite.

EXAMPLE 5

Preparation of 2-amino-6-(N-ethyl-N-p-tolylamino) fluoran.

37.5g of o-[4-(N-ethyl-N-p-tolylamino)-2-hydroxybenzoyl] benzoic acid and 12.3g of p-aminoanisol were dissolved in 200g of concentrated sulfuric acid below 25°C. The solution was allowed to react for 60 hours at 25°C with stirring. The reaction mixture was treated in the same manner as in Example 1. 11g of white crystals melting at 185° – 187°C was obtained. The compound immediately turned brown when contacted with bentonite.

EXAMPLE 6

Preparation of 2-(N, N-dibenzylamino)-6-(N-ethyl-N-p-tolylamino)fluoran.

37.5g of o-[4-(N-ethyl-N-p-tolylamino)-2-hydroxybenzoyl] benzoic acid and 28.9g of p-dibenzylaminphenol were reacted at 25°C for 40 hours with stirring and the reaction mixture was treated in the same manner as in Example 1. 23g of white crystals melting at 156° – 158°C was obtained. The compound immediately turned green when contacted with bentonite.

EXAMPLE 7

Preparation of 2-(N-methyl-N-phenylamino)-6-N-ethyl-N-phenylamino)fluoran.

36.1g of o-[4-(N-ethyl-N-phenylamino)-2-hydroxybenzoyl] benzoic acid and 19.9g of 4-hydroxy-N-methyldiphenylamine were dissolved in 200g of concentrated sulfuric acid below 25°C. The solution was allowed to react for 72 hours at 25°C with stirring. The reaction mixture was treated in the same manner as in Example 1. 18g of white crystals melting at 160° – 161°C was obtained. 5g of this compound was dissolved in a mixture of 100g of carnauba wax, 50g of dibutyl phthalate and 1.0g of polyethylene-glycoloctylphenyl ether at 80° – 90°C. The mixture was applied to a paper.

This paper was placed on the basic sheet having a clay layer thereon so that coated layers of both papers are in contact with each other and a pressure was applied by writing. A clear dark green marking appeared on the basic sheet.

EXAMPLE 8

3 parts of 2-methyl-6-(N-ethyl-N-p-tolylamino)fluoran, prepared by Example 1 was dissolved in a mixture of 50 parts of chlorinated biphenyl and 50 parts of kerosene. A solution of 20 parts of gum arabic in 160 parts of water was added to the solution and the mixture was emulsified. To the emulsion was added a solution of 20 parts of acid-treated gelatin in 160 parts of water. The mixture was adjusted at pH 5 with acetic acid with stirring, 500 parts of water was added to cause coacervation. Thus, a thickened liquid film of gelatin and gum arabic was formed round the oil drops dissolving the coloring agent. Then, the pH was adjusted at 4.4 and 3.8 parts of 37% aqueous formaldehyde solution was added to harden the film. The mixture was cooled to 10°C, adjusted at pH 9 with aqueous solution of sodium hydroxide and allowed to stand for 5 – 6 hours to complete encapsulation. The resulting capsule liquid was applied to a paper sheet and dried. The resulting paper (upper sheet) was superposed on a clay paper (lower sheet) coated with acid clay as the acidic electron-acceptor. Upon application of pressure by pencil or typewriter, there appeared instantaneously a color tone of thick red on the pressured portion of the lower sheet. The resulting colored marking showed a strong stability upon exposure to the sunlight for a long time. Further, so-called "fog" had not occurred when the upper and lower sheets were stored under normal conditions while maintaining the superposed state in the manner as described above.

EXAMPLE 9

2.6 parts of 2-(N-methyl-N-p-tolylamino)-6-(N-ethyl-N-p-tolylamino)fluoran shown in Table II as the compound No. 12 and 0.4 parts of 3, 4-benz-6-(N-ethyl-N-p-tolylamino) fluoran prepared by Example 3 were used as the coloring agent. Both of the compounds were dissolved in a mixture consisting of 50 parts of chlorinated biphenyl and 50 parts of kerosene and the solution was treated in the same manner as described in Example 8, to obtain capsule liquid. The capsule liquid was applied to a paper sheet and dried. The resulting paper (upper sheet) was superposed on a clay paper (lower sheet) coated with acid clay as the acidic electron-acceptor. Upon application of pressure by writing, there appeared instantaneously a dark-black marking on the lower sheet.

This colored marking was not faded or discolored upon exposure to the sunlight for a long time and showed a remarkable stability.

What is claimed is:

1. A compound of the formula

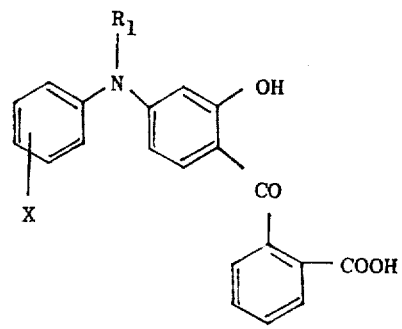

wherein X is hydrogen, halogen or alkyl of 1–5 carbon atoms and $R_1$ is alkyl of 1–5 carbon atoms.

2. A compound according to claim 1, wherein $R_1$ is methyl or ethyl.

3. A compound according to claim 1 wherein X is H or p-$CH_3$.

4. A compound according to claim 1, wherein $R_1$ is methyl or ethyl.